United States Patent [19]

van der Lely

[11] Patent Number: 5,383,423

[45] Date of Patent: Jan. 24, 1995

[54] IMPLEMENT FOR CLEANING TEATS FOR MILK-PRODUCING ANIMALS

[76] Inventor: Cornelis van der Lely, 7 Bruschenrain, CH-6300 Zug, Netherlands

[21] Appl. No.: 70,935

[22] Filed: Jun. 4, 1993

[51] Int. Cl.$^6$ ............................................. A01K 29/00
[52] U.S. Cl. ................... 119/158; 119/14.02
[58] Field of Search ............. 119/156, 158, 14.01, 119/14.02, 14.08, 14.18

[56] References Cited

U.S. PATENT DOCUMENTS

| | | | |
|---|---|---|---|
| 2,228,698 | 1/1941 | Fitches | 119/158 |
| 4,010,714 | 3/1977 | Notsuki et al. | |
| 4,924,809 | 5/1990 | Verbrugge | |
| 5,042,428 | 8/1991 | van der Lely et al. | |
| 5,070,818 | 12/1991 | Gearn et al. | 119/158 X |
| 5,140,947 | 8/1992 | Bruce | 119/158 |
| 5,211,132 | 5/1993 | Farina et al. | 119/158 |

FOREIGN PATENT DOCUMENTS

| | | |
|---|---|---|
| 0277396 | 8/1988 | European Pat. Off. |
| 0323444 | 7/1989 | European Pat. Off. |
| 0360354 | 3/1990 | European Pat. Off. |
| 0476771 | 3/1992 | European Pat. Off. |
| 2501965 | 9/1982 | France |
| 2559351 | 8/1985 | France |
| 00378 | 7/1988 | WIPO |

OTHER PUBLICATIONS

Landtechnik, vol. 41, No. 5, May (1986), Lehrte, DE, pp. 220-223; entitled "Automatisierte Milchviehhaltung-Eine Utopie?".

Primary Examiner—Paul J. Hirsch
Assistant Examiner—Thomas Price
Attorney, Agent, or Firm—Penrose Lucas Albright

[57] ABSTRACT

Apparatus and method for cleaning the teats of milk-producing animals, such as cows, wherein a computer controls a rotatable apparatus which has mounted thereon four cleaning brushes for receiving the teats of the farm animal, cleaning them with a liquid cleansing agent applied to the brushes, and drying same in one part of the operation, and for installing the teat cups on the teats of the animal by rotation of the apparatus in another part of the operation so that the teats are first cleaned, then dried and next the teat cups are applied thereto for milking. The four brushes rotate about parallel horizontal axis and the two outboard brushes have about twice the diameter as the two inboard brushes which are received between pairs of teats. The cleansing agent is discharged generally perpendicular to and above the axis of rotation of the brushes so that it is received approximately tangentially by the brushes. The cleansing liquid drains in a bowl which is received by the animal's udder wherein the liquid is sensed for contamination by a sensor in the drain and the cleaning operation continues until the contamination in the cleaning fluid decreases below a predetermined amount. Thereafter, air is received through the tubes surrounding the axes of the outboard brushes which fling off the cleansing fluid by centrifugal action and proceed to dry the teats and adjacent udder. The brushes (as a unit) are rotatable about a vertical axis about 90° so that they contact all sides of the animal's teats. By lowering and rotating the apparatus which is on a robot arm under the animal, about a horizontal axis, the brushes are moved away from and the teat cups are moved to a position under the teats from where, being guided by sensors, they are raised to be received by the animal's teats and the milking operation commences.

35 Claims, 3 Drawing Sheets

IMPLEMENT FOR CLEANING TEATS FOR MILK-PRODUCING ANIMALS

BACKGROUND OF THE INVENTION

The present invention relates to an apparatus for cleaning teats of milk-producing animals, such as cows. From a standpoint of hygiene and considering the mandatory standards of quality for milk, it is important that the animals' udders, or at least their teats, are cleaned prior to milking. Therefore, in an apparatus for milking animals automatically, a mechanism for cleaning the animals' teats should also be provided.

SUMMARY OF THE INVENTION

The present invention provides a capability for efficiently cleaning animals' teats. According to the invention a computer is included to provide process control. The computer assists in causing the cleansing members to engage with and disengage from an animal's udder and four teats. Liquid cleansing agent is then applied to the cleansing members and at the same time to the animal's udder and teats. Contamination of the liquid cleansing agent, caused by the cleaning process, which drains from the cleansing mechanisms is measured by a monitoring system. When the monitoring system detects that the drained cleansing agent's contamination is reduced to a predetermined level, the cleaning process is terminated, the animal's teats and udder are dried, and the milking process commences. The monitoring may be a sensor which continuously measures the degree of contamination of the spent liquid cleansing agent. The cleaning processes of the invention as well as the subsequent milking process are carried out automatically.

In a specific embodiment of the invention, the cleansing mechanism comprises cleaning members which are operative in at least two different positions. More specifically, the cleaning members operate in two positions which are attained by rotation of the cleaning members as a unit by approximately ninety degrees about an upwardly extending axis. As a result, the animal's teats are scrubbed clean from four directions with the cleansing members operating successively in the two different positions. The cleaning members comprise at least two brushes which are so disposed and rotated during operation simultaneously to clean two sides of each teat. The brushes are in active contact with both sides of one pair of aligned teats so that with two sets of brushes two pairs of aligned teats are simultaneously cleaned on both sides thereof. With the brushes aligned longitudinally in one operative position and transversely in the other operative position relative of the animal, the teats are cleaned from four directions, those directions being displaced ninety degrees from each other.

The invention is further directed to a mechanism comprising at least two brushes that are rotated during operation so that each engaged teat is cleaned on two opposite sides by the scrubbing action of the brushes and the brushes are movable along each teat from top to bottom. Any dirt adhering to a teat is thus brushed downward on both sides. Additionally, each of the brushes is rotatable about a horizontal axis. In an exemplary embodiment, the brushes are of different diameters. Thus, the brushes operating between two pairs of teats are smaller in diameter than those operating on the exterior sides of the pairs of teats. The brushes' fibers can be natural and/or synthetic. Moreover, at least one of the pairs of cleaning members can be a plurality of approximately round textile disks. In general, one or several cleaning members in each set may be provided with rotatable textile disks. Accordingly, the invention also relates to a mechanism for cleaning teats of milk producing animals, such as cows, in which the mechanism may include cleaning members which are comprised of rotatable textile disks. For example, the cleaning members between the pairs of teats may comprise rotatable textile disks whereas those on the exterior sides of the pairs of teats may comprise brushes.

According to another aspect of the invention, the cleaning members are arranged in a bowl which is provided with flexible edges suitable for engaging the animal's udder.

According to still a further object of the invention, the apparatus is provided with a liquid supply system to apply a liquid cleansing agent to the periphery of a cleaning member.

The present invention includes an apparatus for supplying drying air for drying the animal's teats and udder which is delivered through cleaning members. The axes of rotation of the cleaning members coincide with tubes provided with air outlet nozzles or apertures, the tubes being connected to a drying-air supply line, and the cleaning members are rotated at a relatively high rpm, preferably such that any liquid cleansing agent present therein is efficiently expelled therefrom by centrifugal force.

According to still another aspect of the invention a device is provided for determining the locations of the teats which serves for positioning the cleaning members automatically relative to an animal's teats and udder for carrying out the cleaning operation.

In a preferred embodiment, the cleaning members as a unit, are rotatable through approximately 120 degrees about a substantially horizontal axis so that after the cleaning process the cleaning members can be quickly displaced from under the animal's udder. Simultaneously, the teat cups are immediately moved under the animal's udder and teats to be received by corresponding teats. The cleaning members and teat cups are thus be arranged at an angle of approximately 120 degrees with respect to each other on or near the outer end of a robot arm of an automatic milking apparatus. This arrangement provides an option whereby, either the cleaning members or the teat cups can be rapidly positioned for operation relative to the animal's udder and teats by rotation of at least the outer end portion of the robot arm.

According to another aspect of the invention a computer provides process control so that the cleaning members are correctly positioned relative to an animal's udder and teats and the liquid cleansing agent is properly applied thereto during the cleaning process. A monitoring system assesses contamination of the liquid used for cleansing the animal's udder or teats or both that is drained therefrom. When the monitoring system detects that the spent liquid's contamination is below a predetermined amount, the cleaning process is stopped, the wetted teats and udder are dried, and the milking process is started.

Finally, the invention relates to a unique method of cleaning teats of milk-producing animals, such as cows, whereby a cleaning apparatus is automatically received in engagement with the animal's udder and subsequently the cleaning members in the apparatus rotate against the teats for cleaning same. Monitoring means measures the contamination of spent liquid cleansing agent which was applied to the cleaning members and the animal's udder or teats or both. When contamination of the cleansing agent decreases to a predetermined amount, the supply of liquid cleansing agent is secured. The teats are then dried with drying air, teat cups are connected to the animal's teats, and the milking process commences.

The invention will now further be explained with reference to an exemplary embodiment illustrated in the accompanying drawings.

BRIEF DESCRIPTION OF PREFERRED EMBODIMENT

Figure 1:
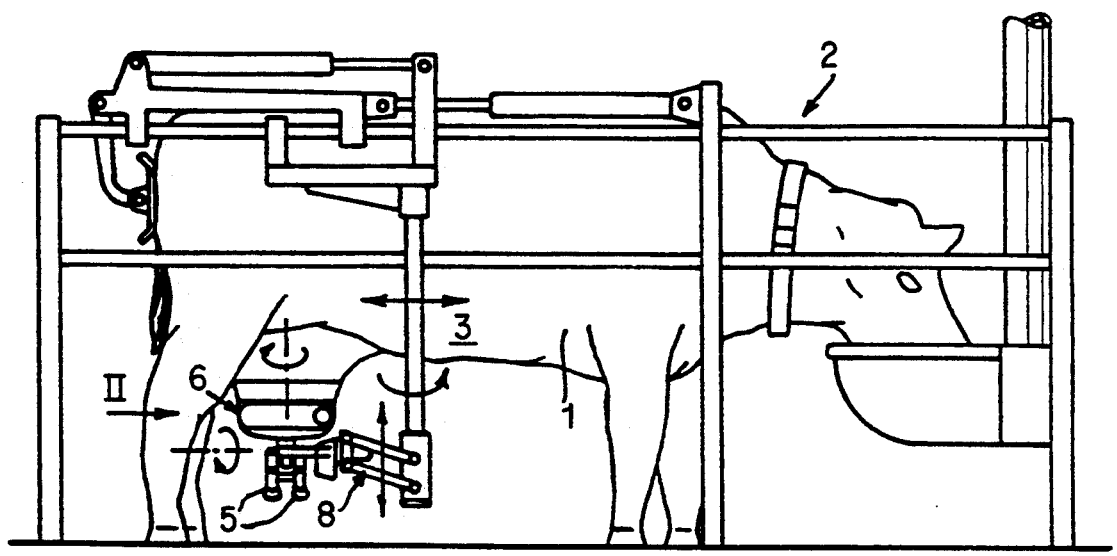
FIG. 1 is a schematic representation of a milking parlor provided with a milking robot, including the milking and cleaning apparatus according to the invention.
Figure 2:
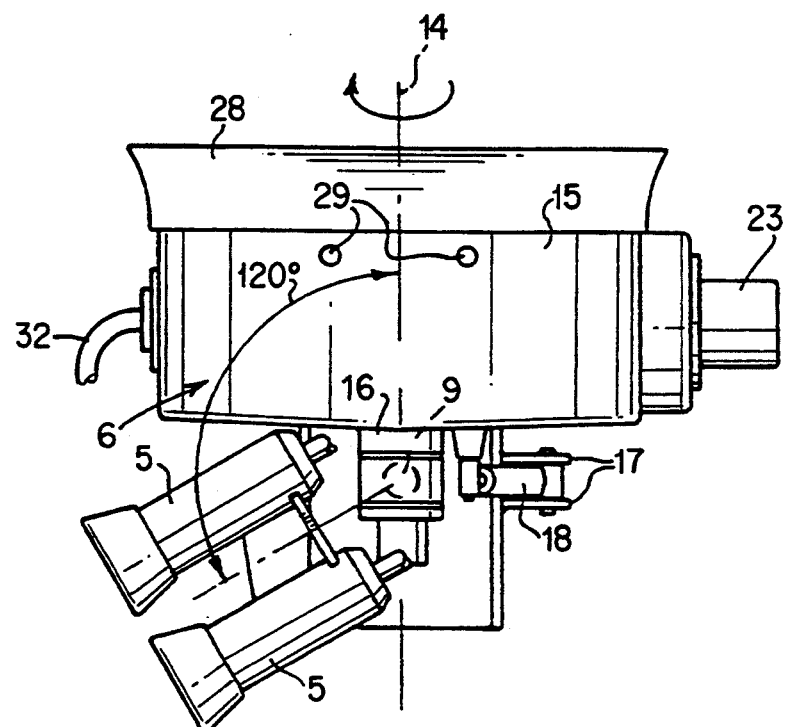
FIG. 2 is a further schematic representation which illustrates the relative orientation of the teat cups and the cleaning apparatus according to the invention and with respect to the robot arm of the milking robot, on which the teat cups and the cleaning apparatus are mounted.

In FIG. 1, a cow 1 in a milking parlor 2 is depicted wherein the milking parlor is provided with a milking robot indicated generally by reference numeral 3. This milking robot is represented only schematically and hereinafter it will not be described in detail inasmuch as it is not, as such, a part of the present invention. The milking robot is movable in the longitudinal direction of milking parlor 2 and one or several robot arms of milking robot 3 can be swung under and away from the cow's teats and udder in a substantially horizontal plane. A robot arm 4 (FIGS. 3 and 4) which functions as carrier of teat cups 5 is vertically movable via further robot arms 8. Various embodiments of similar milking robots have been known for some time and all of them have the capability to position a robot arm or arms provided with teat cups under a cow's udder and by moving the teat cups individually or as a unit, and in the latter case, raising at least the outer end of the robot armor arms at the same time so the teat cups are received by the teats depending from the animal's udder. Robot arm 4 is also provided with a cleaning apparatus 6 for cleaning the teats. Robot arm 4, on which the teat cups 5 and the cleaning apparatus designated generally by reference numeral 6 are mounted, can be rotated about its longitudinal horizontal axis and is supported by a bearing member 7 disposed at the end of further robot arms 8 which can be raised or lowered in an arcuate motion. In a plane perpendicular to the axis of rotation of robot arm 4, teat cups 5 and apparatus 6 are displaced relative to such other by an angle of 120 degrees. Thus by rotating robot arm 4 120 degrees about its longitudinal axis either teat cups 5 or cleaning apparatus 6 can be selectively located under the animal's teats and udder so that the animal's teats either receive teat cups 5 or cleaning apparatus 6 which, in its entirety, engages both the animal's teats and its udder. A computer controlled reversible motor 9 is used to rotate teat cups 5 and cleaning apparatus 6 relative to robot arm 4.

This can also be achieved by, for example, a lever gear under hydraulic control.

Apparatus 6 is provided with cleaning members 10, 11, 12 and 13 which can be operated as a unit in at least two different positions. Such positions are obtained, for example, by rotating the cleaning members through approximately ninety degrees about a vertical axis 14. Cleaning members 10, 11, 12 and 13 are mounted in a bowl 15 which is rotatably supported by a bearing provided at the outer end of robot arm 4 that receives a bottom end part of bowl 15 in the form of a shaft 16. Bowl 15 is turned about the axis 14 by means of a lever ear 17 and a computer controlled hydraulic cylinder 18.

Cleaning members 11, 12, 13, and 14 comprise, for the rear two teats, a pair of brushes 10 and 11, and for the forward two teats, a further pair of brushes 12 and 13, with one brush per pair, 11 and 12 respectively, being arranged between the pairs of teats, the other brushes 10 and 13 respectively, being positioned on the exteriors of the same pairs of teats. In other words, the cleaning members are comprised of brushes 10, 11, 12 and 13, which are rotated during operation so that each teat, or each pair of teats is cleaned on two sides. When bowl 15 is turned ninety degrees by extension of the piston that projects from cylinder 18, brushes 10 and 11 receive and clean the left teats, whereas brushes 12 and 13 receive and clean the right teats of the animal being milked.

Brushes 10 and 11 on one hand and brushes 12 and 13 on the other are rotatable in mutually opposite directions and further the brushes are movable along each teat they engage from top to bottom. Consequently, dirt is removed along the teats in a downward direction. Brushes 10, 11, 12 and 13 are rotatable about respective, substantially horizontal, shafts 19, 20, 21 and 22 and are rotated by a motor 23 and intermeshing spur gears 24, 25, 26 and 27 provided on the shafts. Outboard brushes 10 and 13 are larger in diameter than inboard brushes 11 and 12. Because the corresponding gears 24 and 27 on shafts 19 and 22 are larger than the gears 25 and 26 on the shafts 20 and 21, brushes 11 and 12 rotate at a greater rpm than brushes 10 and 13. Brushes 10 and 13 can have natural bristles or be provided with synthetic fibers. Cleaning members 11 and 12 may comprise a plurality of substantially round textile disks. But whether cleaning members 11 and 12 comprise brushes or rotary textile disks, in both cases they are interengaging. In other words, shafts 20 and 21 are spaced apart by an interval which is smaller than the diameter of either one of the cleaning members. Bowl 15 which houses the cleaning members 10, 11, 12 and 13, is provided with flexible edges 28, so that bowl 15 conforms to and provides an adequate seal around the animal's udder.

Figure 3:
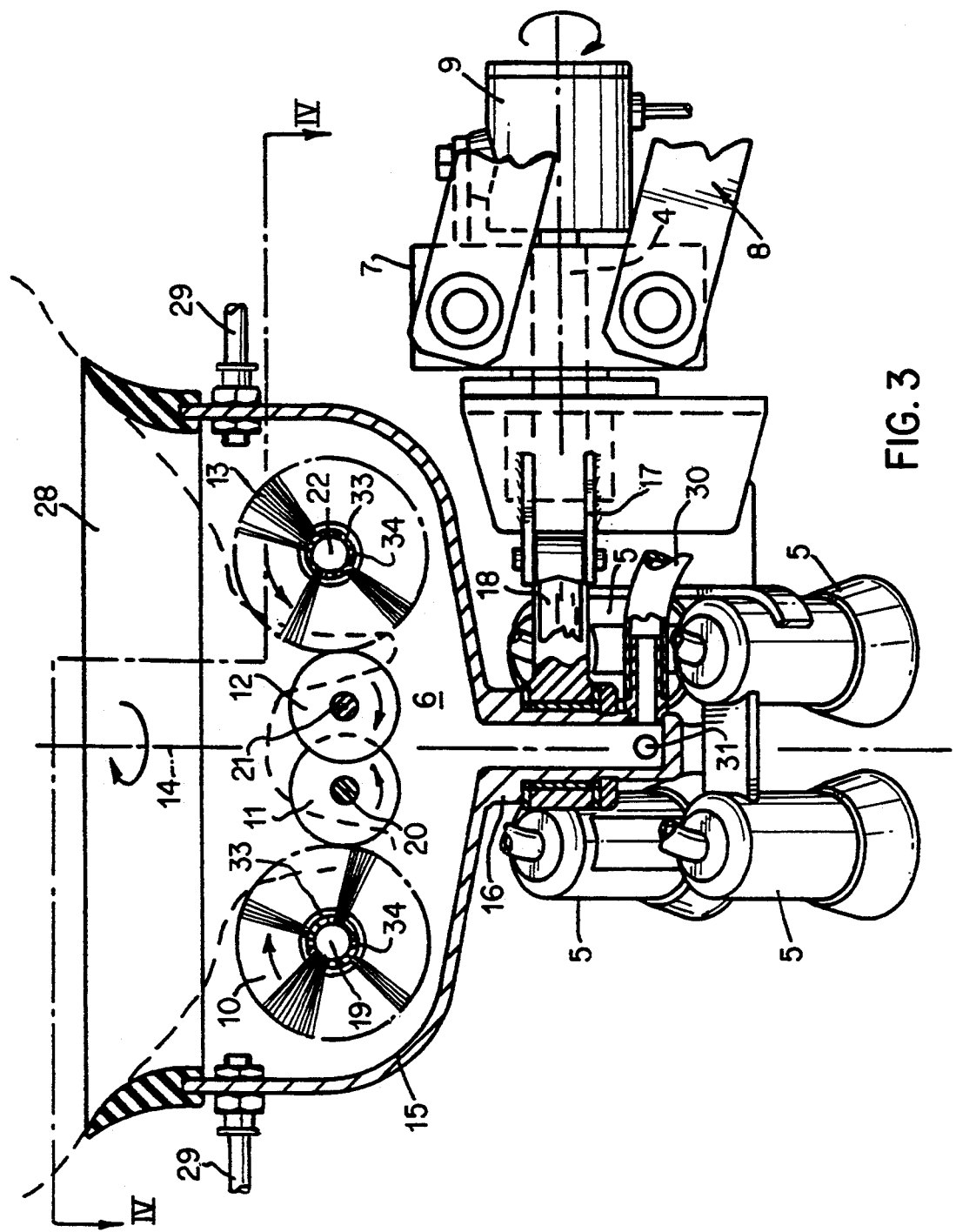
FIG. 3 is a side elevational sectional view of the cleaning apparatus according to the invention.
Figure 4:
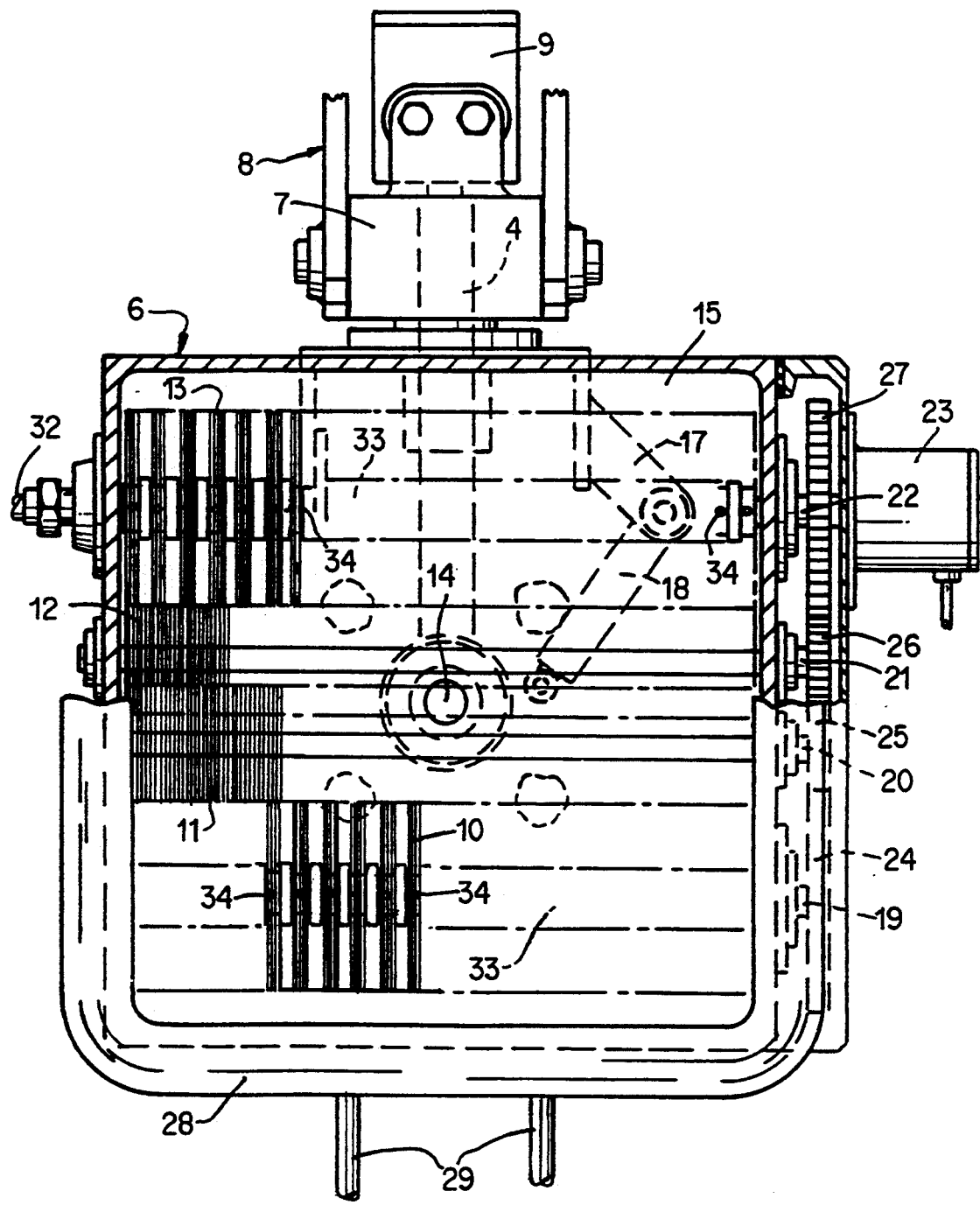
FIG. 4 depicts a plan view of the cleaning apparatus according to the invention.

A system for supplying a liquid cleansing agent for cleaning the animal's teats is provided which directs a stream of liquid cleansing agent to be received at the periphery of a cleaning member. Concerning the liquid supply system, only the connections of conduits 29 on bowl 15 are depicted in FIGS. 3 and 4. The liquid cleansing agent is received by the peripheries of cleaning members 10 and 13 and via them by cleaning members 11 and 12. Because a certain liquid level of cleansing agent is retained in bowl 15, liquid cleansing agent is also received therefrom by cleaning members 10, 11, 12 and 13 whereby the surfaces of the animal's teats which are engaged by the cleaning members are cleaned by their scrubbing action. The liquid drains from bowl 15 through an outlet in its shaft-like bottom end 16 and into a discharge hose 30. A sensor 31 is provided at the foot of the shaft-like bottom end 16 of bowl 15 which is part of a monitoring system for discerning the extent the liquid cleansing agent has been contaminated by the cleaning operation. In principle, the supply of liquid through lines 29 into bowl 15 and its discharge through bottom end 16 of bowl 15 and discharge hose 30 lasts until sensor 31 detects that contamination of liquid cleansing agent is reduced below a predetermined amount. It is then presumed that the animal's teats have been cleaned sufficiently whereupon, after drying the teats and udder, robot arm 4 is caused to be lowered together with bowl 15 which is then displaced 120 degrees by rotation about the longitudinal axis of robot arm 4. Teat cups 5 are simultaneously rotated to a position directly under the animal's teats, so that, upon upward movement of robot arm 4, teat cups 5 are received by the animals' teats, and the process of milking can be commenced.

To dry the animal's teats and udder after the cleaning operation and prior to attaching the teat cups to the animal's teats, the apparatus is provided with a mechanism for blowing dry air over the area which was surrounded by bowl 15 during the cleaning process. In FIG. 4, only one line 32 connecting to bowl 15 is depicted. Drying air is supplied through shafts 19 and 22 which are hollow and, within bowl 15, comprise tubes 33 of cleaning members 10 and 13. The tubes are provided with radial apertures 34. By combining this tubular construction with a relatively high rotary speed of the cleaning members, liquid cleansing agent present in the relevant cleaning members is quickly dissipated by being flung outwardly by centrifugal force.

A system for determining the position of each animal's teats is provided so that the cleaning process and the subsequent milking process may be performed fully automatically. The system enables robot arm 4 to be positioned under the animal wherein bowl 15 easily and correctly engages the animal's udder. After the cleaning is completed, bowl 15 is lowered and displaced 120 degrees by rotation of robot arm 4. Teat cups 5 are positioned under the teats of the animal's udder. If necessary, robot arms 4 and/or 8 are adjusted as needed to ensure that teat cups 5 receive the animal's teats. The positioning system used for this purpose is usually the same system used to position the bowl 15 under the udder, although requirements for satisfactionally positioning of teat cups 5 under the animal's teats are more critical than those for positioning only bowl 15.

The apparatus according to the invention also comprises a computer that provides a process control system including the positioning system. The computer and a hydraulic pressure control system also provide that the cleaning members properly engage the animal's udder and teats, that the liquid cleansing agent is supplied and that the cleaning process for the animal's udder and teats takes place. The computer and the monitoring system further determine the degree of contamination of the liquid cleansing agent and when the contamination is reduced below a predetermined standard, the cleansing process is stopped and, after the udder and teats are dried, the milking process commences.

The invention is not restricted to what is described herein, but also related to details disclosed in the drawings as would be appreciated by one skilled in the art. Although only one embodiment is disclosed, the invention covers modifications thereof which are within the scope of the following claims.

I claim:

1. An apparatus for cleaning teats of milk producing animals, such as cows, which comprises:
    a computer, cleaning means controlled by said computer to be received by the animal's udder and teats which are cleaned thereby;
    a fluid supply member included in said cleaning means, said supply member providing cleaning fluid received by said udder and teats for cleaning same; and
    monitoring means for determining the amount of contamination of the fluid used for cleaning said udder and teats, and for terminating the fluid flowing from said fluid supply member when the contamination of said fluid is determined by said monitoring means to fall below a predetermined amount of contamination.

2. An apparatus as claimed in claim 1, wherein said fluid comprises a liquid cleansing agent, and said monitoring means comprises a sensor for measuring the amount of contamination of said liquid cleansing agent after it has been used to clean said udder and teats.

3. An apparatus as claimed in claim 2, wherein said computer shuts off the flow of said fluid from said fluid supply member upon receiving a signal from said sensor that the contamination of said liquid cleansing agent is below said predetermined amount.

4. An apparatus as claimed in claim 1, wherein said cleaning means comprises a plurality of cleaning members, said cleaning members operating to clean said udder and teats in at least two different positions.

5. An apparatus for cleaning the udder and teats of milk-producing animals, such as cows, comprising:
    cleaning members and positioning means for placing said cleaning members in at least two different positions, said cleaning members cleaning parts of said teats in one said position, and the remaining parts of said teats in the other said position.

6. An apparatus as claimed in claim 5, wherein said positioning means rotates said cleaning members approximately ninety degree about a substantially vertical axis in changing said cleaning members from said one position to said other position.

7. An apparatus in accordance with claim 5, wherein said cleaning members comprise at least two brushes, said brushes simultaneously cleaning at least two sides of each of said teats.

8. An apparatus for cleaning the teats and udder of a milk producing animal, such as a cow, which comprises:
    cleaning members, each said cleaning member comprising at least two brushes which are received simultaneously on each side of at least one of said teats, the said brush on the outboard side of said one teat having a greater diameter than the said brush on the inboard side of said one teat;
    driving means for said brushes, whereby said brushes simultaneously clean at least two sides of said one teat.

9. An apparatus in accordance with claim 8, wherein said driving means rotates said brushes in opposite directions.

10. An apparatus as claimed in claim 7, comprising displacement means for moving said brushes from the top to the bottom of said one teat.

11. An apparatus as claimed in claim 7, wherein said brushes each rotate about substantially horizontal axis.

12. An apparatus in accordance with claim 7, wherein said brushes have generally circular cross-sections, the cross-section of said outboard brush having at least about twice the diameter of the cross-section of said inboard brush.

13. An apparatus as claimed in claim 9, wherein said driving means for said brushes comprises a motor interconnected to said brushes so that it rotates them in opposite directions.

14. An apparatus as claimed in claim 11, wherein said motor rotates said brushes at a relatively high rpm.

15. An apparatus as claimed in claim 6, wherein said brushes comprise fibers.

16. An apparatus in accordance with claim 13, wherein said fibers are synthetic.

17. An apparatus in accordance with claim 7, wherein at least one of said brushes comprises disks composed of textiles.

18. An apparatus in accordance with claim 15, wherein said disks are substantially circular in cross-section.

19. An apparatus as claimed in claim 6, comprising a liquid cleansing supply means for emitting liquid cleansing fluid on at least one of said teats while said cleaning members are being operated, and drying air supply means for discharging drying air on said one teat after it has been cleaned by said cleaning members and said liquid cleansing fluid.

20. An apparatus for cleaning the teats of milk-producing animals, such as cows, comprising:
a liquid fluid discharge member for discharging liquid fluid on at least one of said teats; and
drying air supply means providing a flow of drying air to said one teat for drying same after it has been cleaned by said liquid cleansing fluid.

21. An apparatus in accordance with claim 18, comprising cleaning members for cleaning said one teat with said liquid cleansing fluid, said cleaning members defining passages for confining an air flow therethrough, said passages connected to said drying air supply means and delivering drying air to said one teat.

22. An apparatus as claimed in claim 18, wherein said passages comprise a tube having apertures, said tube being connected to said drying air supply means.

23. An apparatus in accordance with claim 22, comprising driving means for rotating said cleaning members at a sufficient rpm that said liquid cleansing fluid is removed from said cleaning members by centrifugal action when said drying air is supplied to said tube.

24. An apparatus as claimed in claim 19, comprising sensor means for determining the position of said one teat, said cleaning members being guided by said sensor means to contact said teat automatically.

25. An apparatus for cleaning the teats of milk-producing animals, such as cows, comprising:
sensor means for determining the positions of the animal's teats;
cleaning members for the cleaning of each of said teats by direct contact therewith;
positioning means for moving said cleaning members into and from contact with said teats, said sensor means providing guidance for said positioning means, whereby said cleaning members are moved into contact with said teats automatically.

26. An apparatus in accordance with claim 25, wherein teat cups are mounted on said positioning means, rotation means for said positioning means, said rotation means rotating said positioning means approximately 120° about a substantially horizontal axis so that said teats selectively receive said teat cups after having received said cleaning members by said cleaning members being rotated approximately 120° away from said teats, and said teat cups being rotated 120° into the immediate vicinity of said teats.

27. An apparatus as claimed in claim 24, wherein said cleaning members comprise rotary textile disks.

28. An apparatus for cleaning the teats of milk-producing animals, such as cows, comprising:
cleaning members;
positioning means for moving said cleaning members into contact with said teats;
driving means for rotating said cleaning members when in contact with said teats, said cleaning members comprising textile disks which are rotated in contact with said teats to clean same.

29. An apparatus as claimed in claim 26, comprising a bowl, said cleaning members being arranged within said bowl.

30. An apparatus in accordance with claim 27, wherein said bowl is provided with flexible edges that bear against the animal's udder when said textile disks are being rotated against said teats.

31. An apparatus in accordance with claim 28, comprising liquid supply means which receives a liquid cleansing agent and discharges same proximate the periphery of said textile disks.

32. An apparatus for cleaning the teats of milk-producing animals, such as cows, comprising:
rotatable cleaning members that contact said teats for cleaning same;
a liquid supply means for discharging the cleansing agent onto said cleaning members, a discharge exit for said liquid cleansing agent provided from said liquid supply means which is disposed relative to said cleaning member to discharge said cleansing agent approximately tangent to the periphery of said cleaning member.

33. An apparatus as claimed in claim 30, comprising a computer and positioning means for said cleaning members, said computer controlling said positioning means for causing said cleaning members to be brought into contact with the animal's udder and teats, a liquid supply means for supplying liquid cleansing agent thereto while said cleaning members are cleaning said udder and teats, sensor means for monitoring the amount of contamination of the used said liquid cleaning agent which drains from said cleaning members, said sensor means being interconnected with said liquid supply means so as to terminate the supply of said livid cleansing agent from said liquid supply means to said cleaning members when said sensor means senses that said contamination has decreased below a predetermined amount.

34. An apparatus as claimed in claim 31, comprising a bowl which contains and surrounds said cleaning members, and further comprising a drain from said bowl for receiving said used liquid cleaning agent and delivering it to said sensor means.

35. A method for cleaning the teats of milk-producing animals, such as cows, which comprises automatically positioning cleaning members into contact with said teats, rotating said cleaning members along the sides of said teats while discharging a liquid cleansing fluid onto said cleaning members to be received by said teats where they are being contacted by said cleaning members, measuring the degree of contamination of said liauid cleansing fluid after it has been used to clean said teats, terminating the discharge of said liquid cleansing fluid and the contact between said cleaning members and said teats when the contamination of said liquid cleansing fluid decreases below a predetermined amount, discharging drying air against said teats to dry them, automatically placing teat cups on the animal's teats, and milking the animal.

* * * * *

UNITED STATES PATENT AND TRADEMARK OFFICE
CERTIFICATE OF CORRECTION

PATENT NO. : 5,383,423
DATED : January 24, 1995
INVENTOR(S) : Cornelis van der Lely It is certified that error appears in the above-identified patent and that said Letters Patent is hereby corrected as shown below:

ON THE COVER PAGE, AFTER "[22] FILED: JUN. 4, 1993" AND BEFORE "[51]" INSERT THE FOLLOWING:

--[30] FOREIGN APPLICATION PRIORITY DATA
OCT. 4, 1991  [NL] NETHERLANDS....
91.01673--

Signed and Sealed this

Tenth Day of October, 1995

BRUCE LEHMAN

Attest:

Attesting Officer

Commissioner of Patents and Trademarks

UNITED STATES PATENT AND TRADEMARK OFFICE
CERTIFICATE OF CORRECTION

PATENT NO. : 5,383,423
DATED : January 24, 1995
INVENTOR(S) : Cornelis van der Lely It is certified that error appears in the above-identified patent and that said Letters Patent is hereby corrected as shown below:

On the cover page, change "[22] FILED: JUN. 4, 1993" to --[22] PCT Filed: October 1, 1992-- and thereafter insert the following:

--[86] PCT No.: PCT/NL92/00170
§ 371 Date: Aug. 3, 1993
§ 102(e) Date: Aug. 3, 1993

[87] PCT Pub. No.: WO93/06715
PCT Pub. Date: Apr. 15, 1993--

Signed and Sealed this

Twenty-second Day of July, 1997

Attest:

BRUCE LEHMAN

*Attesting Officer*    *Commissioner of Patents and Trademarks*